May 5, 1953  H. A. HADLEY  2,637,546
WEIGHING SCALE
Filed June 9, 1947

INVENTOR.
HARLAN A. HADLEY.
BY Jimmy Price
ATTORNEY.

Patented May 5, 1953

2,637,546

UNITED STATES PATENT OFFICE 2,637,546

WEIGHING SCALE

Harlan A. Hadley, Rutland, Vt., assignor to The Howe Scale Company, a corporation of Vermont Application June 9, 1947, Serial No. 753,542

21 Claims. (Cl. 265—71)

This invention relates to weighing scales for weighing heavy loads such as motor vehicles, railway cars and the like, and relates more particularly for an improved girder chair for such weighing scales.

In my application Serial No. 720,443, filed January 6, 1947, I have described and shown a novel lever system for supporting a platform so that it may have freedom of motion when a load is placed thereon, without placing excessive strain on the scale elements. In weighing scales of this type it is also essential, in order that a correct weighing of the load be obtained, that the platform return to its original or normal position with respect to the lever system after every swinging movement of the platform in its horizontal plane.

Another object of this invention is the provision of an improved girder chair construction wherein the platform is adapted to move relative to the bearings, when a load is driven onto platform, preventing the tendency of the bearings to slide on the knife edges of the pivots.

A further object of this invention is to provide ball bearings for supporting the girder chairs, the center line of the balls being substantially in the same vertical plane of the knife edges of the pivots.

An important object of this invention is to provide an improved girder chair construction for supporting a platform on the lever system so that it would have freedom of movement in all directions in a horizontal plane without placing undue strain on the scale pivots or excessive rocking of the scale pivots in their bearings.

Other objects and advantages of this invention, together with certain details of construction and combinations of parts, will appear from the following detailed description and will be pointed out in the appended claims.

In the drawings wherein a preferred embodiment of my invention is shown,

Like reference numerals indicate like parts throughout the several views of the drawing.

Figure 1:
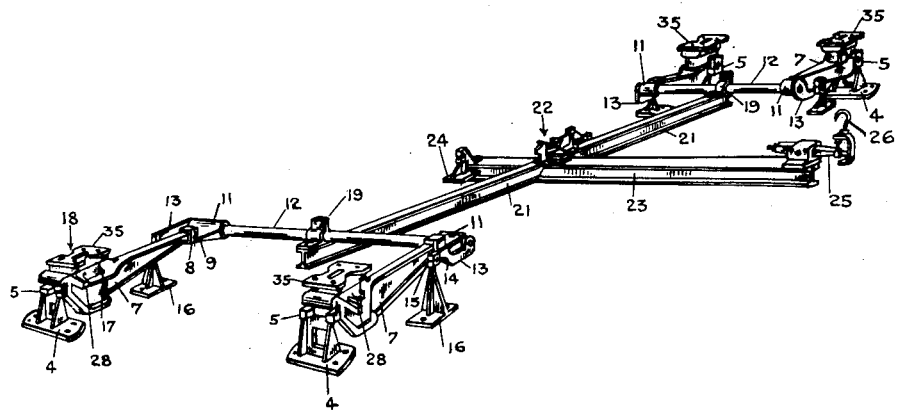
Fig. 1 is a perspective view of a lever system in which girder chairs of my invention are employed.

Referring to the drawing for a detailed description of my invention, the reference numeral 4 indicates main fulcrum stands having sealed thereon bearings 5 in which rest fulcrum pivots 6 fixed in the butt end of load receiving levers 7. The other end of load receiving levers 7 are provided with pivots 8 which rest on bearings 9 carried in brackets 11 fixed to pipe levers 12. Each end of pipe lever 12 has fixed thereon a fulcrum bracket 13 in the free end of which is mounted a pivot 14, adapted to rest in a bearing 15 carried in the upper end of pipe lever fulcrum stands 16.

Each load receiving lever 7 is provided with an opening 17 which receives a girder chair of my invention, generally indicated by reference numeral 18, hereinafter more fully described.

Pipe levers 12 have fixed thereto brackets 19 which have attached thereto one end of main arms 21. These main arms are operatively connected by a connection 22 to a transverse lever 23. One end of transverse lever 23 is fulcrumed on fulcrum stand 24. The tip end of the transverse lever has mounted thereon an adjustable nose-iron 25 which is adapted to be connected to any suitable beam outfit (not shown), by means of a loop 26 connected to said nose-iron.

The novel girder chair arrangement of my invention comprises a support 27 having integral arms 28 which rest on the curved upper surface of bearings 29. Each of the arms 28 carries a tapered pin 30 adapted to be received in an opening 30' in the top of each of the bearings. These bearings rest on pivots 31 mounted in the edges of the load receiving lever 7 adjacent the opening 17 therein.

The bearing structure herein described provides a shock absorber. Thus, when a load is driven onto the platform, the platform is free to move, thus preventing the tendency of the bearings 29 to slide longitudinally on the knife edges of the pivots 31. The bearings are self-aligning, being free to rock in a vertical plane and to move to provide perfect alignment to the knife edges of the pivots.

The support 27 is provided with a well 32 the bottom of which has depressions 33 therein for the reception of anti-friction ball bearings 34. A girder chair 35, of which there are four, is carried by each of said supports 27. The girder chair 35 comprises a casting having a depending portion 36 at the bottom surface of which are depressions 37 adapted to rest on the ball bearings 34, The casting has a skirt 38 which is wider than well 32 in support 27, the construction preventing dirt from falling into the well and depressions 33.

The platform of the weighing scale may be supported directly on the four girder chairs 35 or on a frame carried on said girder chairs.

An important feature of the instant invention is that the center line of balls 34 is substantially in line with the knife edge of pivots 31. Thus any vertical angular deflection coming from the platform supports does not throw a horizontal component into the lever system which would cause errors, as would occur if the balls were positioned above or below the knife edge of pivots 31. In the present construction, where the center line of the balls and the knife edges of the pivots are in the same horizontal plane, the possibility of error is reduced to a minimum.

By positioning the knife edge of pivots 31 in substantially the same horizontal plane as the center of the balls 34, there will not be any vertical lever arm or moment which would occur if the center line of the balls were positioned substantially above or below the knife edge of the bearing 31.

For example, if a lateral load is applied by a heavy motor vehicle or railway car being driven to the platform, there will be a certain horizontal moment or movement and this moment or movement would tend to slide the bearings 29 on the knife edges of the pivots 31 if the center line of the balls 34 were positioned substantially above or below the plane of the knife edges of the pivots 31.

Figures 2, 3:
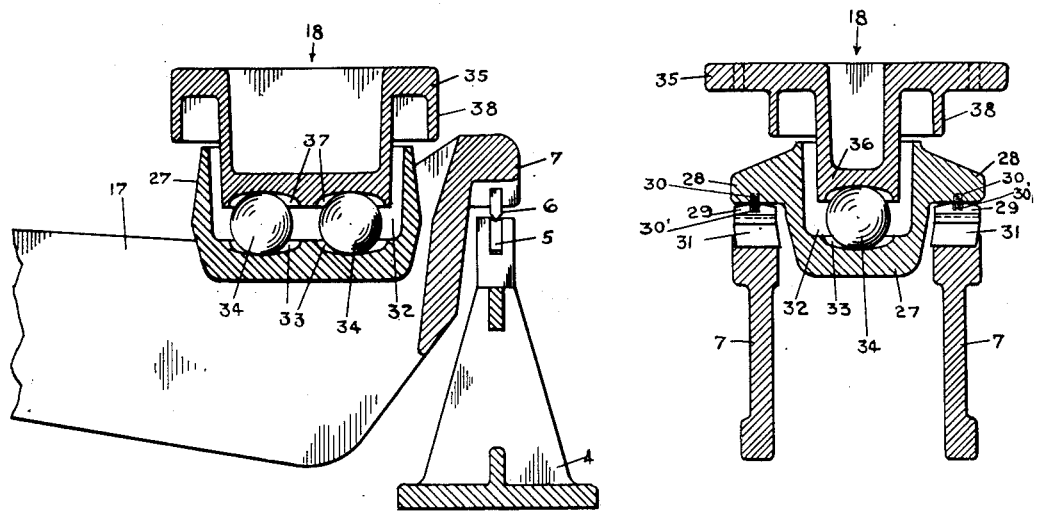
Fig. 2 is a cross-sectional view, on an enlarged scale, of a girder chair shown in position within the butt end of a load receiving lever.
Fig. 3 is a cross-sectional view, also on an enlarged scale, showing the girder construction mounted in its support pivotally mounted in bearings on the load receiving lever.
Figure 4:
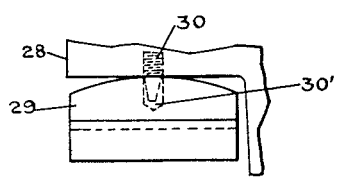
Fig. 4 is a detail view, on an enlarged scale, of a bearing on which the girder chair is carried.

It is true that there will be some movement of the balls 34 and the knife edges if loads are applied from above and to the right or left of the arrow 18 in Fig. 3 but the horizontal component is greatly decreased and does not seriously affect operation where the balls and knife edges are in substantially the same plane.

Moreover, by placing the center line of the balls 34 upon the pivot line, the twisting or tipping tendency of the support 27 is also eliminated, giving a more advantageous operation without placing undue strain on the scale pivots and with the elimination of excessive rocking of the scale pivots in their bearing.

The girder chair arrangement described above supports the platform of the weighing scale in such a manner that the platform is permitted to have freedom of movement in its horizontal plane without excessively rocking bearings 29 on pivots 31 or pivots 6 on bearings 5. The platform would in effect, roll on ball bearings 34 and the depressions 33 and 37 cause the girder chairs, and platform supported thereby, to assume their original or normal position after a load is placed thereon or after it is removed therefrom.

As many changes could be made in the above-mentioned construction and many different embodiments of this invention could be made without departing from the scope thereof, it is intended that all matter contained in the above description or shown in the accompanying drawings shall be interpreted as illustrative and not in a limiting sense.

What I claim as new and desire to secure by Letters Patent is:

1. In a weighing scale, the combination with a lever having a bifurcated portion providing an opening therebetween, of a cup-shaped girder chair support carried by said lever and extending into said opening, anti-friction bearings on said girder chair support, and a girder chair supported on said anti-friction bearings, the sides of said girder chair support being provided with knife edge bearings on said bifurcated portion of said lever and said knife edge bearings being in the same horizontal plane as said first-mentioned bearings.

2. In a weighing scale, the combination with a lever having a bifurcated portion providing an opening therebetween, of a cup-shaped girder chair support carried by said lever and extending into said opening, ball bearings on said girder chair support, and a girder chair supported on said ball bearings, the sides of said girder chair support being provided with knife edge bearings on said bifurcated portion of said lever and said knife edge bearings being in the same horizontal plane as said first-mentioned bearings.

3. In a weighing scale, the combination with a lever having a bifurcated portion providing an opening therebetween, of a cup-shaped girder chair support carried by said lever and extending into said opening, depressions in said girder chair support, ball bearings in said depressions, and a girder chair having depressions therein resting on said ball bearings, the sides of said girder chair support being provided with knife edge bearings on said bifurcated portion of said lever and said knife edge bearings being in the same horizontal plane as said first-mentioned bearings.

4. In a weighing scale, the combination with a lever having a bifurcated portion providing an opening therebetween, of pivots on said lever adjacent said opening, a cup-shaped girder chair support supported on said pivots and extending into said opening, anti-friction bearings on said girder chair support, and a girder chair supported on said anti-friction bearings, the sides of said girder chair support being provided with knife edge bearings on said bifurcated portion of said lever and said knife edge bearings being in the same horizontal plane as said first-mentioned bearings.

5. In a weighing scale, the combination with a lever having a bifurcated portion providing an opening therebetween, of pivots on said lever adjacent said opening, a cup-shaped girder chair support supported on said pivots and extending into said opening, ball bearings on said girder chair support, and a girder chair supported on said ball bearings, the sides of said girder chair support being provided with knife edge bearings on said bifurcated portion of said lever and said knife edge bearings being in the same horizontal plane as said first-mentioned bearings.

6. In a weighing scale, the combination with a lever having a bifurcated portion providing an opening therebetween, of pivots on said lever adjacent said opening, a cup-shaped girder chair support supported on said pivots and extending into said opening, the bottom of the cup of said girder chair support having receiving depressions, ball bearings in said depressions, and a girder chair having depressions therein resting on said ball bearings, the sides of said girder chair support being provided with knife edge bearings on said bifurcated portion of said lever and said knife edge bearings being in the same horizontal plane as said first-mentioned bearings.

7. In a weighing scale, the combination with a lever having a bifurcated portion providing an opening therebetween, of pivots on said lever adjacent said opening, a cup-shaped girder chair support supported on said pivots, said support having a well, ball bearing in said well and a girder chair supported on said ball bearings.

8. In a weighing scale, the combination with a lever having a bifurcated portion providing an opening therebetween, of pivots on said lever adjacent said opening, a cup-shaped girder chair support supported on said pivots, said support having a well, the bottom of said well having depressions, ball bearings in said depressions, and a girder chair having depressions resting on said ball bearings.

9. In a weighing scale, the combination with a lever having a bifurcated portion providing an opening therebetween, of pivots on said lever adjacent said opening, a cup-shaped girder chair support having arms supported on said pivots, said support being provided with a well and depressions in the bottom of said well, ball bearings in said depressions, and a girder chair having depressions resting on said ball bearings.

10. In a weighing scale, the combination with a lever, of pivots, having knife edges, on said lever, a girder chair support supported on said pivots, ball bearings on said girder chair support, the center line of said ball bearings and the knife edges of said pivots being in the same horizontal plane, and a girder chair supported on said ball bearings.

11. In a weighing scale, the combination with a lever, of pivots on said lever, self-aligning bearings on said pivots, a cup-shaped girder chair support supported on said bearings, anti-friction means on said girder chair support, and a girder chair supported on said anti-friction means, the sides of said girder chair support being provided with knife edge bearings on said bifurcated portion of said lever and said knife edge bearings being in the same horizontal plane as said first-mentioned bearings.

12. In a weighing scale, the combination with a lever, of pivots provided with knife edges on said lever, self-aligning bearings on said pivots, a girder chair support supported on said bearings, ball bearings on said girder chair support, the center line of said ball bearings and the knife edges of said pivots being in the same horizontal plane, and a girder chair supported on said ball bearings.

13. In a weighing scale, the combination with a lever having a bifurcated portion providing an opening therebetween, of pivots, having knife edges, on said lever on each side of said opening, self-aligning bearings on said pivots, a cup-shaped girder chair supported on said bearings, ball bearings on said girder chair support, the center line of said ball bearings and the knife edges of said pivots being in the same horizontal plane, and a girder chair supported on said ball bearings.

14. In a weighing scale of the type for heavy loads of the character of motor vehicles and railway cars, the combination therewith of a platform carrying, ball bearing supported girder chair construction comprising main fulcrum stands carrying knife edge support bearings, load receiving levers having butt ends carrying fulcrum pivots resting on said support bearings, girder chairs pivotally mounted on said load receiving levers and each girder chair, each including a cup-shaped support having outstanding arms and bearings resting on said load receiving levers and supporting said outstanding arms, said last-mentioned bearings being in the same horizontal plane as the ball bearing of said girder chair construction.

15. The construction of claim 14 in which the girder chair is also cup-shaped and extends into said cup-shaped support and the inside face of the bottom of the cup-shaped support and the outside face of the bottom of the girder chair are provided with recesses, and ball bearings positioned between said recesses.

16. The construction of claim 14, said last mentioned bearings including a lower knife edge and an upper pillow with a curved upper surface, the knife edge contacting the load receiving levers and the curved upper edges contacting the outstanding arms of said cup-shaped support.

17. The construction of claim 14, said last mentioned bearings including a lower knife edge and an upper pillow with a curved upper surface, the knife edge contacting the load receiving levers and the curved upper edges contacting the outstanding arms of said cup-shaped support, said curved upper surface being centrally provided with a recess and each of said outstanding arms having downwardly projecting pins received in said recesses.

18. The construction of claim 14 in which said girder chairs are provided with outstanding skirts to cover and prevent entry of dirt into the cup-shaped supports.

19. The construction of claim 14, said load-receiving levers being bifurcated and said cup-shaped supports extending into the space between said bifurcations.

20. A weighing scale for weighing heavy loads such as motor vehicles, railway cars and the like, a girder chair construction comprising a main fulcrum stand carrying bearing supports, load receiving levers provided with fulcrum pivots bearing on said supports, said load receiving levers intermediate of their length receiving bearing rests, a recessed girder chair support having arms resting on said bearing rests, said support receiving a plurality of spaced anti-friction ball bearings in the recessed part thereof and a girder chair supported on said anti-friction ball bearings, said anti-friction ball bearings and said bearing rests being located in the same horizontal plane.

21. The scale of claim 20 in which the bearing rests are provided with a central recess in which the arms have pins extending into each of said recesses.

HARLAN A. HADLEY.

References Cited in the file of this patent

UNITED STATES PATENTS

| Number | Name | Date |
| --- | --- | --- |
| 1,268,197 | Winslow | June 4, 1918 |
| 1,385,592 | Starr | July 26, 1921 |
| 1,759,902 | Howard | May 27, 1930 |
| 1,894,009 | Starr | June 10, 1933 |
| 2,162,622 | Lindsay | June 13, 1939 |